(12) United States Patent
Okamoto

(10) Patent No.: US 10,507,585 B2
(45) Date of Patent: Dec. 17, 2019

(54) ROBOT SYSTEM THAT DISPLAYS SPEED

(71) Applicant: FANUC CORPORATION, Yamanashi (JP)

(72) Inventor: Takahiro Okamoto, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/005,744

(22) Filed: Jun. 12, 2018

(65) Prior Publication Data

US 2018/0361591 A1 Dec. 20, 2018

(30) Foreign Application Priority Data

Jun. 19, 2017 (JP) .................................. 2017-119697

(51) Int. Cl.
*B25J 9/16* (2006.01)

(52) U.S. Cl.
CPC ........... *B25J 9/1697* (2013.01); *B25J 9/1602* (2013.01); *B25J 9/1664* (2013.01); *B25J 9/1671* (2013.01)

(58) Field of Classification Search
CPC ...... B25J 9/1697; B25J 9/1602; B25J 9/1664; B25J 9/1671
USPC ......................................................... 382/154
See application file for complete search history.

(56) References Cited

U.S. PATENT DOCUMENTS

| | | |
|---|---|---|
| 4,972,131 A | 11/1990 | Kojyo et al. |
| 8,812,159 B2* | 8/2014 | Maehara ................ B25J 9/1676 318/568.11 |
| 2013/0120547 A1* | 5/2013 | Linnell .................... G06T 13/40 348/61 |
| 2014/0253722 A1* | 9/2014 | Smyth ..................... G01P 3/38 348/135 |
| 2014/0354787 A1* | 12/2014 | Linnell ................ H04N 5/2224 348/61 |
| 2018/0092559 A1* | 4/2018 | Wybo ................. A61B 5/04001 |
| 2018/0222050 A1* | 8/2018 | Vu ......................... G01S 17/026 |

FOREIGN PATENT DOCUMENTS

| | | |
|---|---|---|
| CN | 1758990 A | 4/2006 |
| CN | 105291107 | 2/2016 |
| JP | 2-256483 A | 10/1990 |
| JP | H9-193060 A | 7/1997 |
| JP | 2010-167515 A | 8/2010 |
| JP | 2013-94961 A | 5/2013 |
| JP | 2016-43452 A | 4/2016 |

* cited by examiner

*Primary Examiner* — Jonathan S Lee
(74) *Attorney, Agent, or Firm* — Hauptman Ham, LLP

(57) ABSTRACT

A robot system includes a model storage unit; a model display unit; an input unit for inputting an allowable speed of the robot; a calculation unit for calculating a predicted maximum speed of the robot, based on a trajectory plan of an operation command to be applied to the robot; a speed modification unit for modifying a command speed of the robot such that the predicted maximum speed becomes the allowable speed or lower, when the predicted maximum speed is higher than the allowable speed; and a speed display unit for displaying at least one of the allowable speed, the predicted maximum speed, the ratio between an actual speed of the robot after the command speed is modified and the allowable speed, and the actual speed of the robot, in relation to the robot, in the model of the robot.

5 Claims, 6 Drawing Sheets

ROBOT SYSTEM THAT DISPLAYS SPEED

RELATED APPLICATIONS

The present application claims priority of Japanese Application Number 2017-119697, filed on Jun. 19, 2017, the disclosure of which is hereby incorporated by reference herein in its entirety.

BACKGROUND OF THE INVENTION

1. Field of the Invention

The present invention relates to a robot system that displays a speed.

2. Description of Related Art

Industrial robots are generally decelerated under control such that the speed of the robot, more specifically, the speed of a TCP (tool center point) does not exceed a predetermined safety speed, in a specific condition, for example, in a teaching mode. Even in a production mode after the teaching, in human collaborative robots that collaborate with humans in shared operation space, the speeds of portions other than the TCP, e.g. a portion corresponding to an elbow of an arm, may be limited, so that the robots pose no damage to the humans.

As to the control of the speed of an industrial robot, Japanese Unexamined Patent Publication (Kokai) No. 02-256483 discloses that "after converting a move command speed between teaching points into a command speed of each axis, comparing the converted command speed of each axis with an allowable speed of each axis, and when the command speed exceeds the allowable speed, determining an axis having the maximum ratio between the allowable speed of each axis and the command speed of each axis, and modifying the move command speed between the teaching points such that the command speed of the axis becomes the allowable speed or lower". In Japanese Unexamined Patent Publication (Kokai) No. 02-256483, the allowable speed of each axis may correspond to a maximum axial speed of each axis.

SUMMARY OF THE INVENTION

When a command speed is modified such that the speeds a plurality of specific portions, other than a TCP, of a robot become allowable speeds or lower, the actual speed of the TOP may not reach its allowable speed. In this case, an operator may be confused about whether or not the speed of the robot is limited more than necessary.

Thus, a robot system that can inform the correct speed of each portion of a robot is demanded.

A first aspect of the disclosure provides a robot system that includes a model storage unit for storing a model of a robot; a model display unit for displaying the model of the robot stored in the model storage unit; an input unit for inputting an allowable speed of at least one portion of the robot; a trajectory planning unit for performing trajectory planning based on an operation command to be applied to the robot; a calculation unit for calculating a predicted maximum speed of the at least one portion of the robot, based on a result of the trajectory planning; a speed modification unit for modifying a command speed of the robot, such that the predicted maximum speed becomes the allowable speed or lower, when the predicted maximum speed of the at least one portion of the robot calculated by the calculation unit is higher than the allowable speed; and a speed display unit for displaying at least one of the allowable speed, the predicted maximum speed, and a ratio between an actual speed of the robot after the command speed is modified by the speed modification unit and the allowable speed, as well as the actual speed of the robot, in relation to the at least one portion of the robot, in the model of the robot displayed by the model display unit.

According to the first aspect, since the allowable speed, the predicted maximum speed, the ratio, and the actual speed of the robot are displayed in relation to at least one of the portions of the robot model, the operator can be informed of the correct speed of each portion of the robot. As a result, the operator is not confused about whether or not the speed of a TOP of the robot is limited more than necessary.

The objects, features, and advantages of the present invention and other objects, features, and advantages will be more apparent from the following detailed description of preferred embodiments relating to the accompanying drawings.

DETAILED DESCRIPTION OF THE INVENTION

Figure 1:
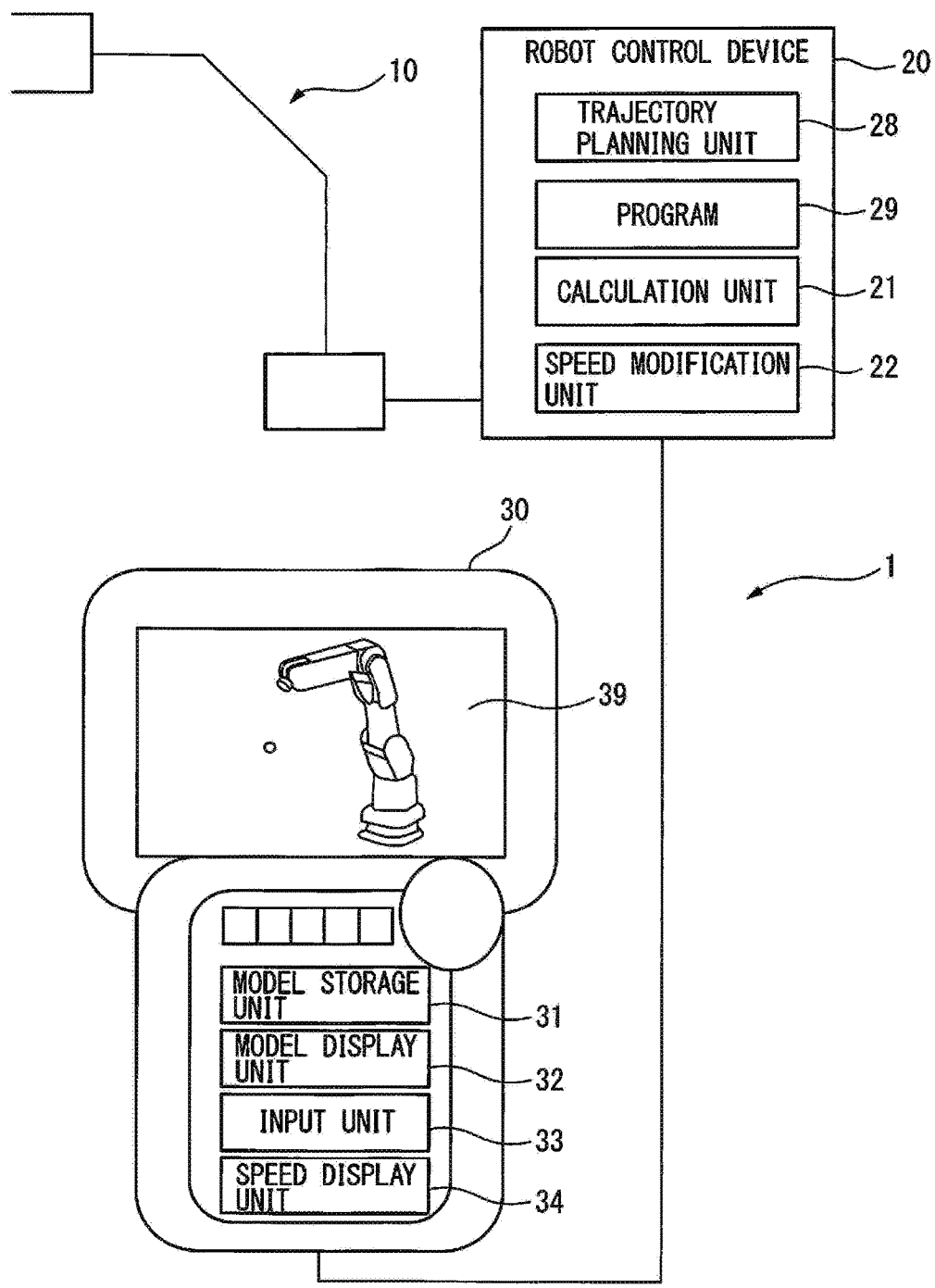
FIG. 1 is a schematic diagram of a robot system according to a first embodiment.

Embodiments of the present invention will be described below with reference to the accompanying drawings. In the drawings, the same or similar components are indicated with the same reference numerals. For ease of understanding, the scales of the drawings are appropriately modified.

FIG. 1 is a schematic diagram of a robot system according to a first embodiment. A robot system 1 according to the first embodiment mainly includes a robot 10, a robot control device 20 for controlling the robot 10, and a teach pendant 30 connected to the robot control device 20. The robot 10 is a multi-articulated robot having, for example, six axes. The robot 10 may collaborate with a human in shared operation space. A servomotor for driving each axis of the robot 10 is provided with a position detector, e.g. an encoder. The position detector functions as an actual speed obtaining unit to obtain the actual speed of each portion of the robot 10.

The teach pendant 30 is used in a teaching operation and the like of the robot 10. An operator operates the teach pendant 30 to perform jogging and the like of each axis of the robot 10. The teach pendant 30 includes a model storage unit 31 for storing models, e.g. two-dimensional models and three-dimensional models, of the robot 10. The model storage unit 31 may further store models for tools (not shown) attached to the robot 10 and peripheral devices of the robot 10. The teach pendant 30 further includes a model display unit 32 for displaying the model of the robot 10 stored in the model storage unit 31. The model display unit 32 displays the model of the robot 10 on a screen 39, e.g. a screen 39 of the teach pendant 30, in response to the present position and orientation of the robot 10.

The teach pendant 30 further includes an input unit 33 from which an allowable speed for at least one portion of the robot 10 is inputted. The input unit 33 may include a touch panel and/or a plurality of buttons provided on the teach pendant 30. Alternatively, the allowable speed may be inputted from the robot control device 20. The at least one portion of the robot 10 includes an elbow portion, a wrist axis, a TCP (tool center point), and the like of the robot 10. Thus, the allowable speed may be set on a portion-by-portion basis, or the allowable speed may be common to every portion.

The teach pendant 30 further includes a speed display unit 34 that displays at least one of the allowable speed of the robot 10, a predicted maximum speed of the robot 10, and the ratio between an actual speed of the robot 10 after a command speed is modified by a speed modification unit described later and the allowable speed, as well as the actual speed of the robot 10, in relation to the at least one portion of the robot 10, the model of which is displayed by the model display unit 32. The speed display unit 34 displays the allowable speed and the like of the robot 10 on the screen 39, in response to a demand from the operator. The actual speed of the robot 10 is calculated by a known method, based on a detection value of the position detector for each axis of the robot 10.

The robot control device 20 is a digital computer that has a CPU, a memory, and the like connected each other through a bus and the like. The robot control device 20 includes an operation program on which, for example, the operator performs an operation in shared operation space with the robot 10. As described later, the operation program. 29 includes operation commands to move the robot 10 to positions taught in advance, and the like. The robot control device 20 further includes a trajectory planning unit 28 that reads the operation commands to be applied to the robot 10 and performs trajectory planning. The robot control device 20 further includes a calculation unit 21 for calculating the predicted maximum speed or speed of the at least one portion of the robot 10, based on a trajectory plan of the operation commands to be applied to the robot 10.

The robot control device 20 further includes the speed modification unit 22 that, when a predicted maximum speed of at least one portion of the robot 10 calculated by the calculation unit 21 is higher than an allowable speed, modifies a command speed for the robot 10 such that the predicted maximum speed becomes the allowable speed or lower.

The speed display unit 34 of the teach pendant 30 may display a teaching speed written in the operation program, and an actual speed of the robot 10 after the speed modification unit 22 modifies a command speed, on the screen 39. An operator can be thereby informed of the correct actual speed after the modification. Furthermore, the contents of the operation program 29 may be also displayed on the screen 39.

Figure 2:
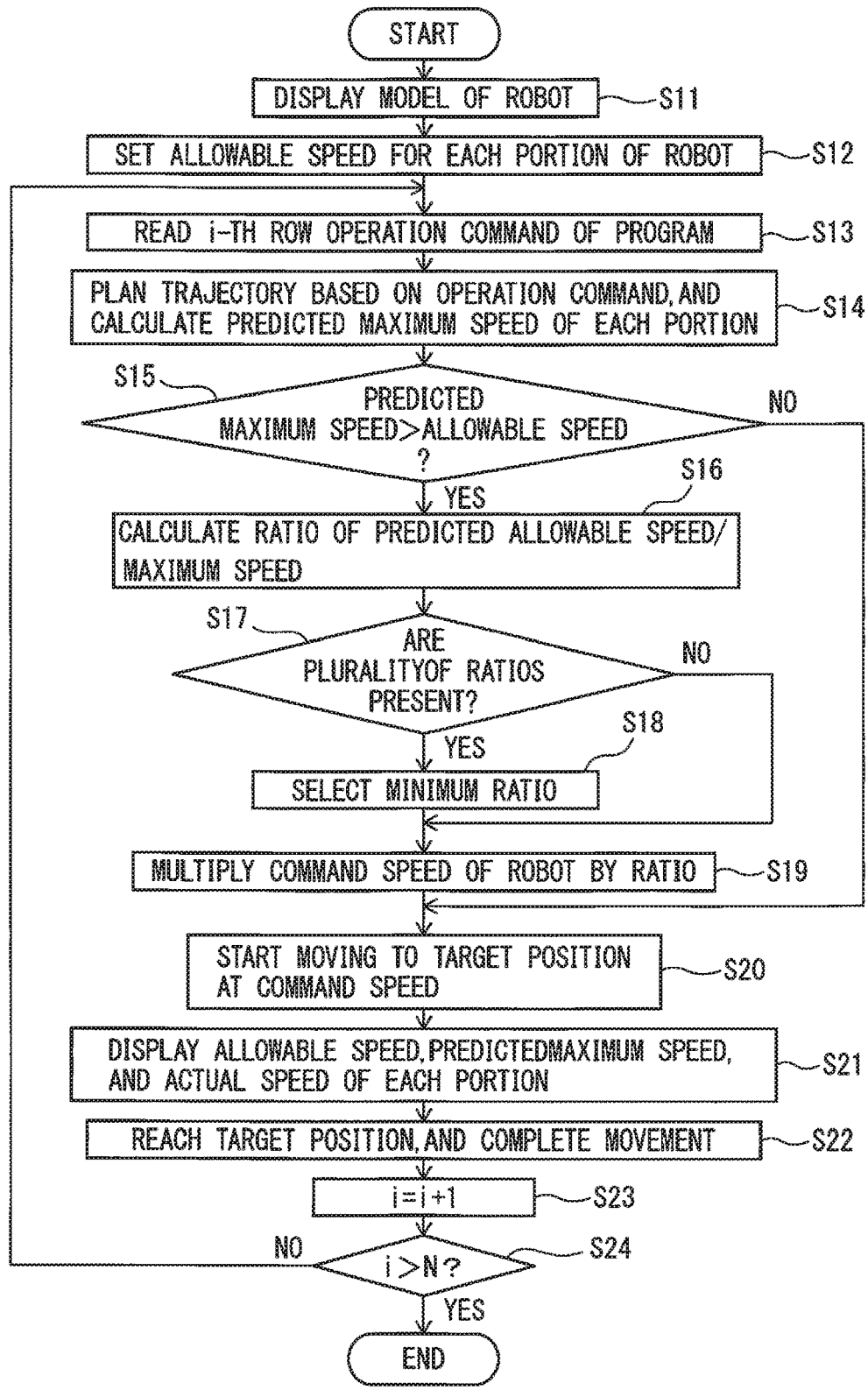
FIG. 2 is a flowchart of the operation of the robot system shown in FIG. 1.

FIG. 2 is a flowchart of the operation of the robot system shown in FIG. 1.

Figure 3:
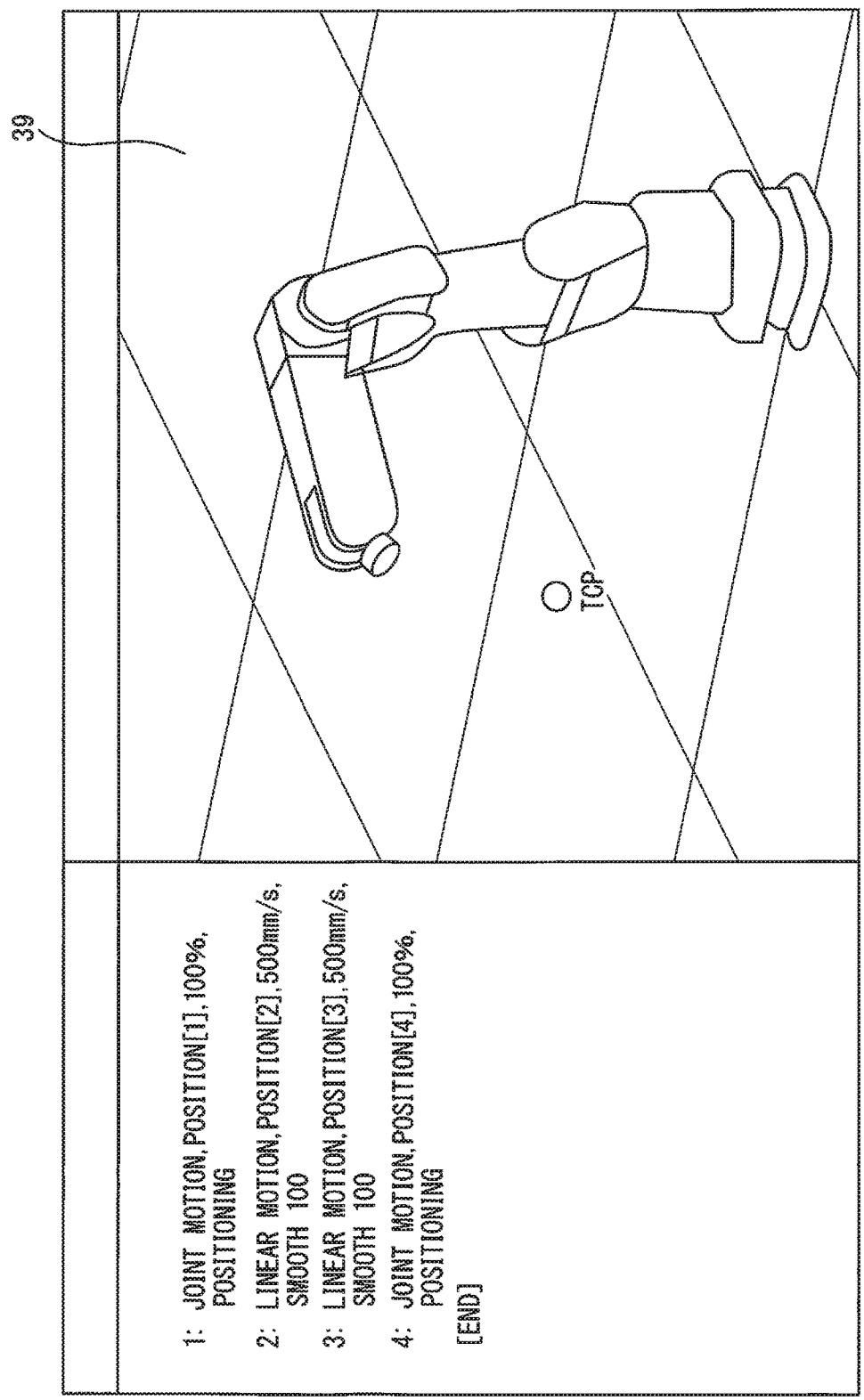
FIG. 3 is a drawing showing a first example of a screen.

In step S11, for example, a three-dimensional model of the robot 10 stored in the model storage unit 31 is read. The model display unit 32 displays the three-dimensional model of the robot 10 on the screen 39. FIG. 3 is drawing showing a first example of the screen 39. On the right of FIG. 3, the three-dimensional model of the robot 10 is displayed, together with a TCP.

Then, in step S12, an operator inputs an allowable speed of the robot 10 from the input unit 33. The following description is on the assumption that an allowable speed $A_e$ for an elbow portion, an allowable speed $A_w$ for a wrist axis, and an allowable speed $A_t$ for the TOP are inputted.

Then, in step S13, an i-th row command of total N-row operation commands written in the operation program 29 is read (N and i are natural numbers). On the left of FIG. 3, a part of the operation program 29 is displayed.

Then, in step S14, the trajectory planning unit 28 performs trajectory planning based on the commands read in S13, and the calculation unit 21 calculates a predicted maximum speed of each portion of the robot 10. To be more specific, the calculation unit 21 calculates predicted maximum speeds $M_e$, $M_w$, and $M_t$ of the elbow portion, the wrist axis, and the TCP of the robot 10, respectively.

Figure 4:
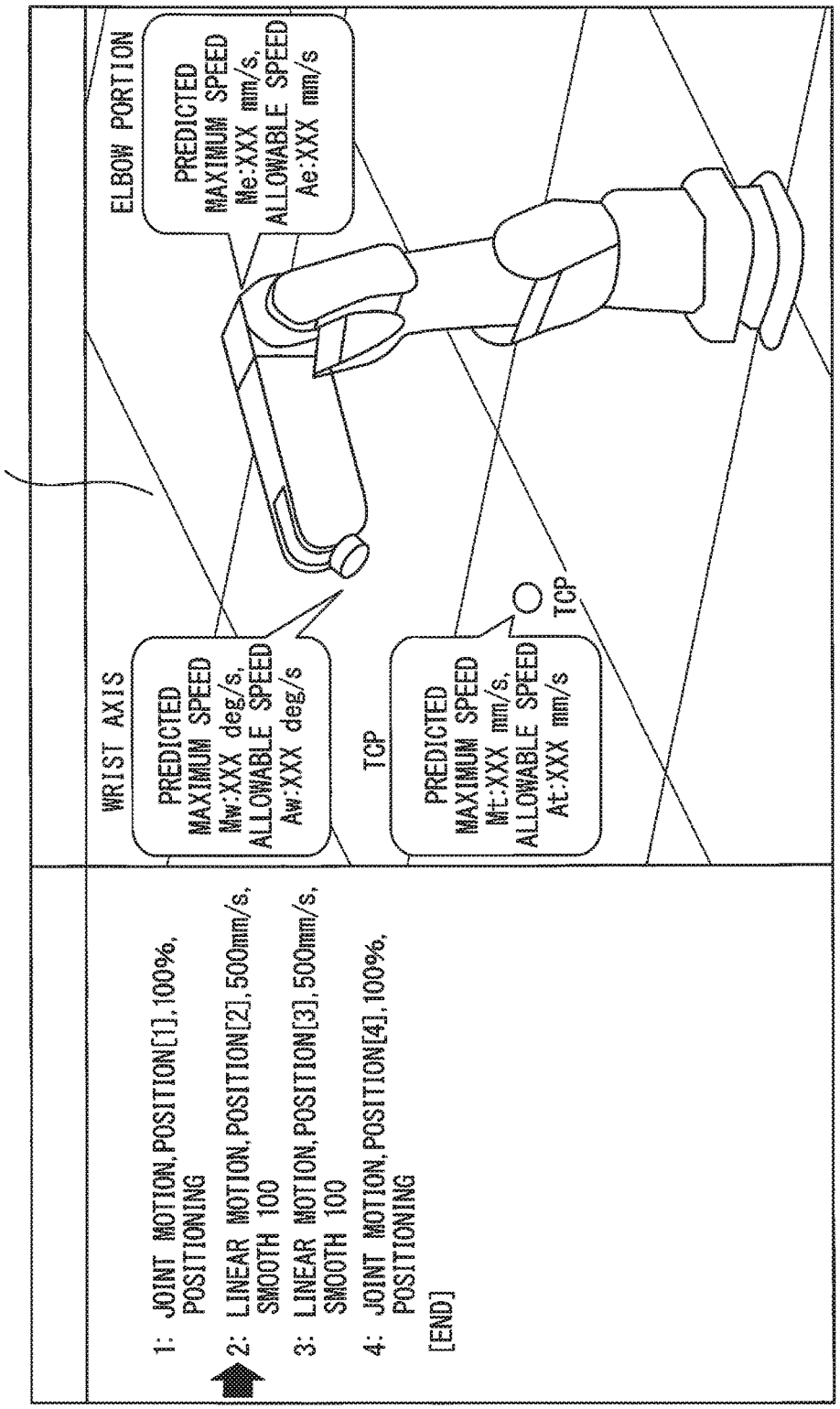
FIG. 4 is a drawing showing a second example of the screen.

As shown on the left of FIGS. 3 and 4, operation forms such as "LINEAR MOTION" and "JOINT MOTION", target positions, movement speeds, and the like are designated in the operation program 29. For example, "LINEAR MOTION, POSITION [2], 500 mm/s, SMOOTH 100" written in the second row denotes moving from a present position to a position designated by POSITION [2] by interpolation on a straight path at a predicted maximum speed of 500 mm/s. The trajectory planning unit 28 plans a trajectory of the robot so as to satisfy the operation forms written in the operation program 29 based on the operation commands.

Since the position and orientation of an arbitrary portion to be observed at an arbitrary time is known from the trajectory plan, the calculation unit 21 can calculate each of the predicted maximum speeds $M_t$, $M_e$, and $M_w$.

In step S15, whether or not the predicted maximum speeds $M_e$, $M_w$, and $M_t$ of the elbow portion, the wrist axis, and the TCP of the robot 10 are higher than the corresponding allowable speeds $A_e$, $A_w$, and $A_t$, respectively, is determined. When none of the predicted maximum speeds $M_e$, $M_w$, and $M_w$ is higher than the allowable speeds $A_e$, $A_w$, and $A_t$, respectively, the operation proceeds to step S20.

When any of the predicted maximum speeds $M_e$, $M_w$, and $M_t$ is determined to be higher than the allowable speeds $A_e$, $A_w$, and $A_t$, respectively, the operation proceeds to step S16. In step S16, the ratio between the allowable speed and the predicted maximum speed $A_e/M_e$, $A_w/M_w$, or $A_t/M_t$ is calculated, as to the portion at which the predicted maximum speed $M_e$, $M_w$, or $M_t$ is determined to be higher than the allowable speed $A_e$, $A_w$, or $A_t$.

Then, in step S17, whether or not there are a plurality of portions at each of which the predicted maximum speed is determined to be higher than the allowable speed, and whether or not there are a plurality of ratios thereof are determined. When there are a plurality of portions at each of which the predicted maximum speed is determined to be higher than the allowable speed, a minimum one of the ratios is selected in step S18. Then, the operation proceeds to step S19, and a command speed written in the operation program 29 is multiplied by the selected ratio. When there are not determined to be a plurality of ratios, in other words, when a single ratio is determined to be present in step S17, the command speed is multiplied by the ratio.

By multiplying the command speed by the ratio, the command speed can be easily reduced. In step S20, a movement to a target position is started at the new command speed. Since the predicted maximum speeds become the allowable speeds or lower, it is possible to prevent damage to the operator or humans who share the operation space.

After that, in step S21, the speed display unit 34 displays at least one of the allowable speeds Ae, Aw, and At, the predicted maximum speeds Me, Mw, and Mt, the ratios between the allowable speeds and the predicted maximum speeds Ae/Me, Aw/Mw, and At/Mt, and the actual speed of the robot 10. FIG. 4 is a drawing showing a second example of the screen. In the second example, the speed display unit 34 displays the predicted maximum speed Mw and the allowable speed Aw of the wrist axis, in relation to the wrist axis of the robot 10. To be more specific, the predicted maximum speed Mw and the allowable speed Aw are displayed, using an arrow pointing to the wrist axis of the robot 10 and/or in a balloon extending from the wrist axis of the robot 10. Alternatively, the speed display unit 34 may display the predicted maximum speed Mw and the allowable speed Aw using another window at the wrist axis of the robot 10 or in the vicinity thereof. In the same manner, the speed display unit 34 displays the predicted maximum speeds Me and Mt and the allowable speeds Ae and At, in relation to the elbow portion and the TCP of the robot 10, respectively. The operator can be thereby informed of the correct speed information on each portion of the robot 10.

The speed display unit 34 may display the new command speed and/or the actual speed of the robot 10 based on the new command speed. After that, when the robot 10 reaches the target position and completes its movement, the operation proceeds to the (i+1)-th row operation command of the operation program 29 in steps S22 and S23. When all the operation commands of the operation program 29 have been executed, the operation is ended.

According to this disclosure, as described above, at least one of the allowable speed, the predicted maximum speed, and the ratio is displayed, as well as the actual speed, in visually relation to at least one portion to be observed in the robot model. Therefore, the operator can be informed of the correct speed of the portion to be observed of the robot.

Even when the command speed is modified such that the speeds of the specific portions, other than the TCP, of the robot become the allowable speeds or lower, and the actual speed of the TCP therefore does not reach the allowable speed, the reason thereof is apparent for the operator, so the operator is not confused about whether or not the speed of the robot is limited more than necessary.

Figure 5:
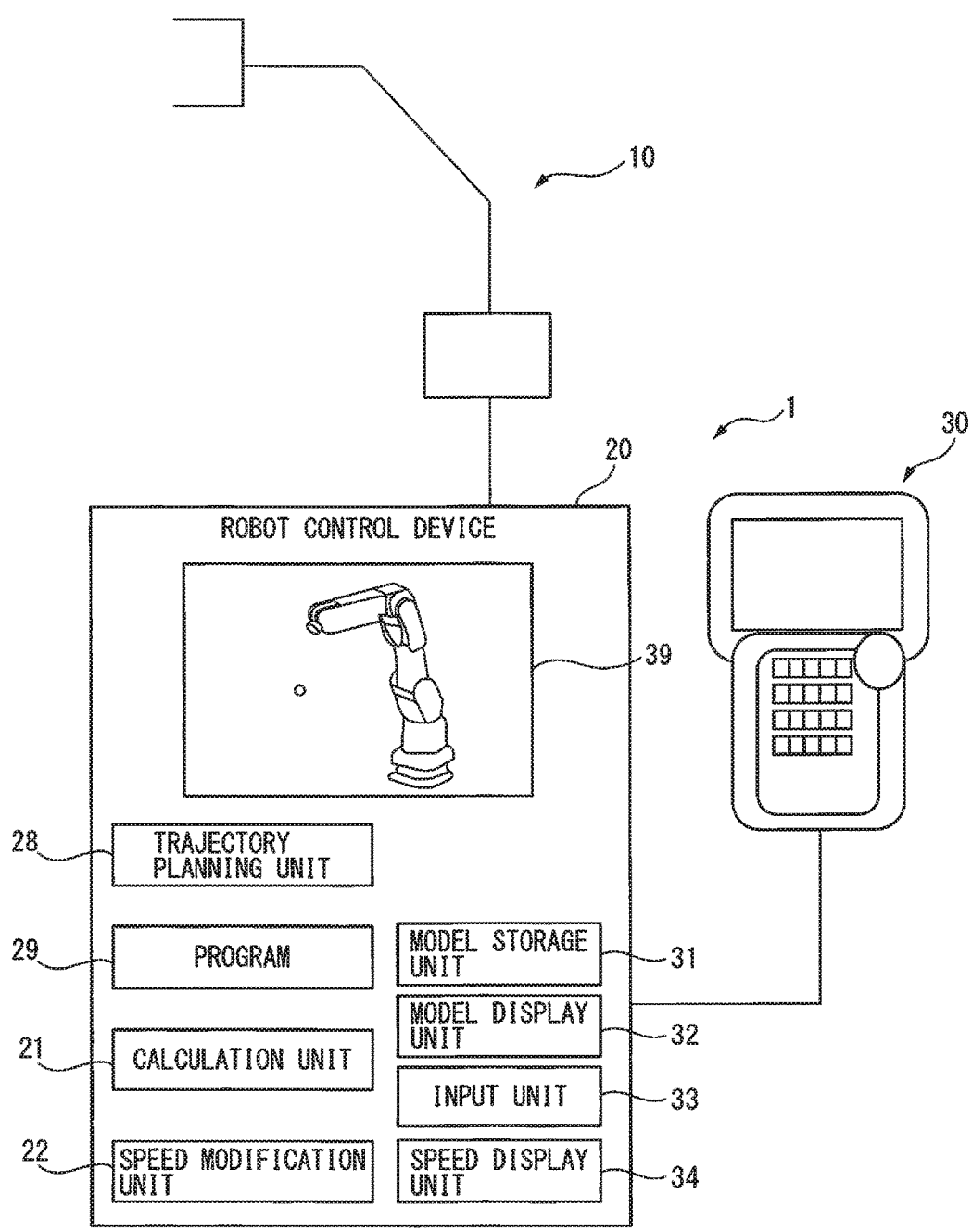
FIG. 5 is a schematic diagram of a robot system according to a second embodiment.

Furthermore, FIG. 5 is a schematic diagram of a robot system according to a second embodiment. In FIG. 5, a robot control device 20 includes a calculation unit 21, a speed modification unit 22, a trajectory planning unit 28, an operation program 29, a model storage unit 31, a model display unit 32, an input unit 33, and a speed display unit 34. A model and the speed of a robot are displayed on a screen of the robot control device 20. In the configuration of FIG. 5, only the robot control device 20 functions as a robot system 1 according to the disclosure.

Figure 6:
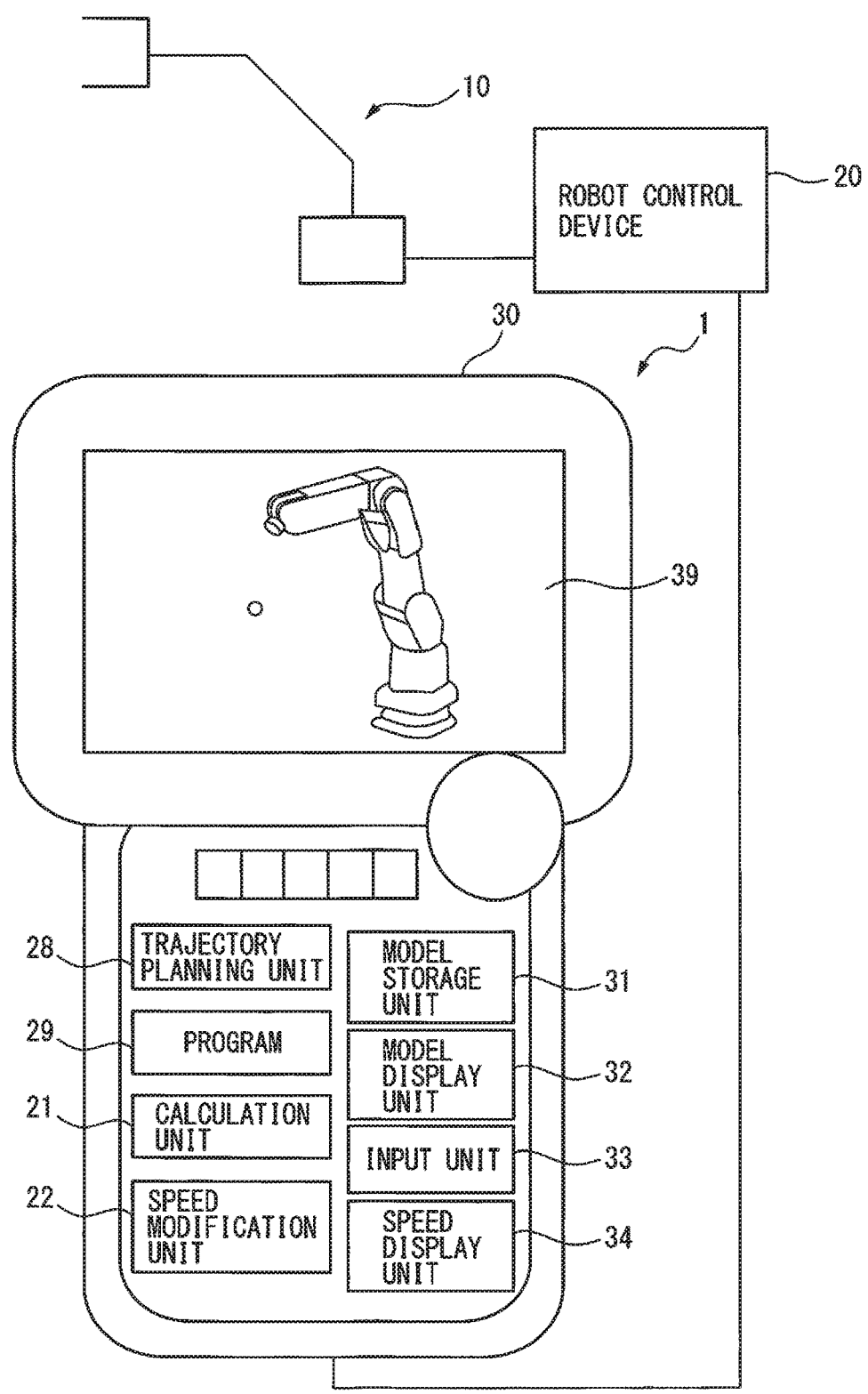
FIG. 6 is a schematic diagram of a robot system according to a third embodiment.

Furthermore, FIG. 6 is a schematic diagram of a robot system according to a third embodiment. In FIG. 6, a teach pendant 30 includes a calculation unit 21, a speed modification unit 22, a trajectory planning unit 28, an operation program 29, a model storage unit 31, a model display unit 32, an input unit 33, and a speed display unit 34. In the configuration of FIG. 6, only the teach pendant 30 functions as a robot system 1 according to the disclosure. The scope of the disclosure includes the instances shown in FIGS. 5 and 6.

Aspects of the Disclosure

A first aspect provides a robot system (1) that includes a model storage unit (31) for storing a model of a robot (10); a model display unit (32) for displaying the model of the robot stored in the model storage unit; an input unit (33) for inputting an allowable speed of at least one portion of the robot; a calculation unit (21) for calculating a predicted maximum speed of the at least one portion of the robot, based on a trajectory plan of an operation command to be applied to the robot; a speed modification unit (22) for modifying a command speed of the robot such that the predicted maximum speed becomes the allowable speed or lower, when the predicted maximum speed of the at least one portion of the robot calculated by the calculation unit is higher than the allowable speed; and a speed display unit (34) for displaying at least one of the allowable speed, the predicted maximum speed, and a ratio between an actual speed of the robot after the command speed is modified by the speed modification unit and the allowable speed, as well as the actual speed of the robot, in relation to the at least one portion of the robot, in the model of the robot displayed by the model display unit.

According to a second aspect, in the first aspect, the at least one portion of the robot includes at least one of a TCP, an elbow portion, and a wrist axis of the robot.

According to a third aspect, in the first or second aspect, when the predicted maximum speed of the at least one portion calculated by the calculation unit is higher than the allowable speed, the speed modification unit calculates a ratio between the predicted maximum speed and the allowable speed, and multiplies the command speed of the robot by the ratio to thereby modify the command speed.

According to a fourth aspect, in the third aspect, when there are a plurality of portions at each of which the predicted maximum speed is higher than the allowable speed, the command speed is multiplied by a minimum one of a plurality of the ratios.

According to a fifth aspect, in any one of the first to fourth aspects, the speed display unit further displays the actual speed of the robot after the command speed is modified by the speed modification unit.

Effects of the Aspects

According to the first and second aspects, since at least one of the allowable speed, the predicted maximum speed, and the ratio is displayed, as well as the actual speed, in visually relation to the at least one portion in the robot model, the operator can be informed of the correct speed of the portion of the robot. As a result, the operator is not confused about whether or not the speed of the TCP of the robot is limited more than necessary.

According to the third aspect, the command speed can be easily reduced, using the ratio between the predicted maximum speed and the allowable speed.

According to the fourth aspect, the command speed can be further reduced using the minimum ratio.

According to the fifth aspect, the operator can be informed of the correct actual speed after the modification.

The preset invention is described above using the preferred embodiments, but it is apparent for those skilled in the art that the modifications described above and various other modifications, omissions, additions, and the like can be applied, without departing from the scope of the present invention.

What is claimed is:

1. A robot system comprising:
   a model storage unit for storing a model of a robot;
   a model display unit for displaying the model of the robot stored in the model storage unit;

an input unit for inputting an allowable speed of each of a plurality of portions of the robot;

a trajectory planning unit for reading an operation command to be applied to the robot and performing trajectory planning;

a calculation unit for calculating a predicted maximum speed of each of the plurality of portions of the robot, based on a result of the trajectory planning;

a speed modification unit for modifying a command speed of the robot such that the predicted maximum speed becomes the allowable speed or lower, when the predicted maximum speed of each of the plurality of portions of the robot calculated by the calculation unit is higher than the allowable speed; and a speed display unit for displaying at least one of the allowable speed, the predicted maximum speed, and a ratio between an actual speed of the robot after the command speed is modified by the speed modification unit and the allowable speed, as well as the actual speed of the robot, in relation to each of the plurality of portions of the robot, in the model of the robot displayed by the model display unit.

2. The robot system according to claim 1, wherein the plurality of portions of the robot includes at least one of a TCP, an elbow portion, and a wrist axis of the robot.

3. The robot system according to claim 1, wherein when the predicted maximum speed of each of the plurality of portions calculated by the calculation unit is higher than the allowable speed, the speed modification unit calculates a ratio between the predicted maximum speed and the allowable speed, and multiplies the command speed of the robot by the ratio to thereby modify the command speed.

4. The robot system according to claim 3, wherein when there are a plurality of portions at each of which the predicted maximum speed is higher than the allowable speed, the command speed is multiplied by a minimum one of a plurality of the ratios.

5. The robot system according to claim 1, wherein the speed display unit further displays the actual speed of the robot after the command speed is modified by the speed modification unit.

* * * * *